United States Patent [19]

Roth et al.

[11] Patent Number: 4,709,623
[45] Date of Patent: Dec. 1, 1987

[54] CEILING DISTRIBUTOR DUCT ASSEMBLY FOR ROOFTOP AIR CONDITIONERS

[75] Inventors: James E. Roth, DeSoto; David W. Bales, Manchester, both of Mo.

[73] Assignee: Nordyne, Inc., St. Louis, Mo.

[21] Appl. No.: 899,249

[22] Filed: Aug. 22, 1986

[51] Int. Cl.[4] .............................................. F24F 13/06
[52] U.S. Cl. ..................... 98/40.05; 98/2.05; 98/2.11; 98/2.14; 98/31.5
[58] Field of Search ................ 98/2, 2.11, 2.14, 2.15, 98/31.5, 31.6, 40.05, 40.24, 2.05

[56] References Cited

U.S. PATENT DOCUMENTS

| | | | |
|---|---|---|---|
| 2,210,458 | 8/1940 | Keilholtz | 98/31.6 X |
| 3,309,502 | 3/1967 | Witherspoon, Jr. | 98/31.5 X |
| 3,522,839 | 8/1970 | Wendt et al. | 98/2.11 X |
| 3,657,992 | 4/1972 | Minnick, Jr. | 98/2.11 |
| 3,868,896 | 3/1975 | Doll et al. | 98/2.11 |
| 3,937,133 | 2/1976 | Bertin et al. | 98/40.24 |
| 4,189,987 | 2/1980 | Amberg et al. | 98/2.15 X |
| 4,608,834 | 9/1986 | Rummel | 98/2.11 X |

FOREIGN PATENT DOCUMENTS 2121161 12/1983 United Kingdom ................. 98/2.11

Primary Examiner—William E. Wayner
Assistant Examiner—Steven E. Warner
Attorney, Agent, or Firm—Jerome A. Gross

[57] ABSTRACT

A low profile ceiling duct assembly to be used with rooftop air conditioners. The unit combines an octagonal sheet metal ceiling plate which provides the upper portion of a plenum chamber; this extending into the roof space above a ceiling opening. The lower plenum portion is provided by the molded plastic octagonal air distributor box, mounted against the edges of the plate and extending into the room space sufficiently to afford air flow sidewardly outward from the plenum. The air distributor box has outlet grilles at alternate sides of the octagon. They discharge air in four directions along the ceiling line while return air is drawn centrally upward.

13 Claims, 4 Drawing Figures

CEILING DISTRIBUTOR DUCT ASSEMBLY FOR ROOFTOP AIR CONDITIONERS

FIELD OF THE INVENTION

This invention relates to ceiling distributor duct assemblies for discharging air from a rooftop air conditioning unit.

DESCRIPTION OF THE PRIOR ART

It is conventional to use air distributor boxes attached to the ceilings of vans and recreational vehicles on whose roofs are mounted air conditioners. Such distributor boxes normally extend several inches downward from the ceiling into the room space. They may include plenum distributors which typically start at the level of the ceiling, to receive conditioned air flowing downward from the ceiling level, and divide it for discharge in more than one direction about the sides of a central return air opening. To install and service an optional heating assembly in such a unit is ordinarily cumbersome; it may require removal of the entire air box assembly.

SUMMARY OF THE INVENTION

The present invention lessens the interference with head room provided by conventional distributor boxes, and affords much improved air distribution as well as convenient installation and servicing, including the installation and servicing of an optional heater assembly.

A distributor plenum commences at a level above the ceiling, and smoothly divides the flow of conditioned air into two flows in opposite directions behind the return air opening. We utilize two principal assemblies, an upper plate assembly, preferably of sheet metal, which includes an upper plenum, and a molded plastic air distributor box, which has integral vertical walls extending upward to the ceiling plate.

In order to minimize head room interference, the upper plenum extends upward, well above the ceiling line, into the space beneath the roof upon which the air conditioning unit is mounted. By positioning part of the plenum chamber above the ceiling line, the present shallow air distributor box suffices without diminution of airflow.

The ceiling plate and distributor box assembly provides a duct system through which conditioned air is led to the four outlet grilles at alternate faces in the outer margin of the preferably octagonal box, and is thus discharged at ceiling level outwardly in four directions, while room air is returned upward through a central return air opening, thus providing a highly advantageous pattern of air circulation.

BRIEF DESCRIPTION OF THE DRAWINGS

FIGS. 1, 2 and 3 show front and rear access doors in open position; when closed upwards they conform to the octagonal shape of the distributor box.

DESCRIPTION OF THE PREFERRED EMBODIMENT

Figure 2:
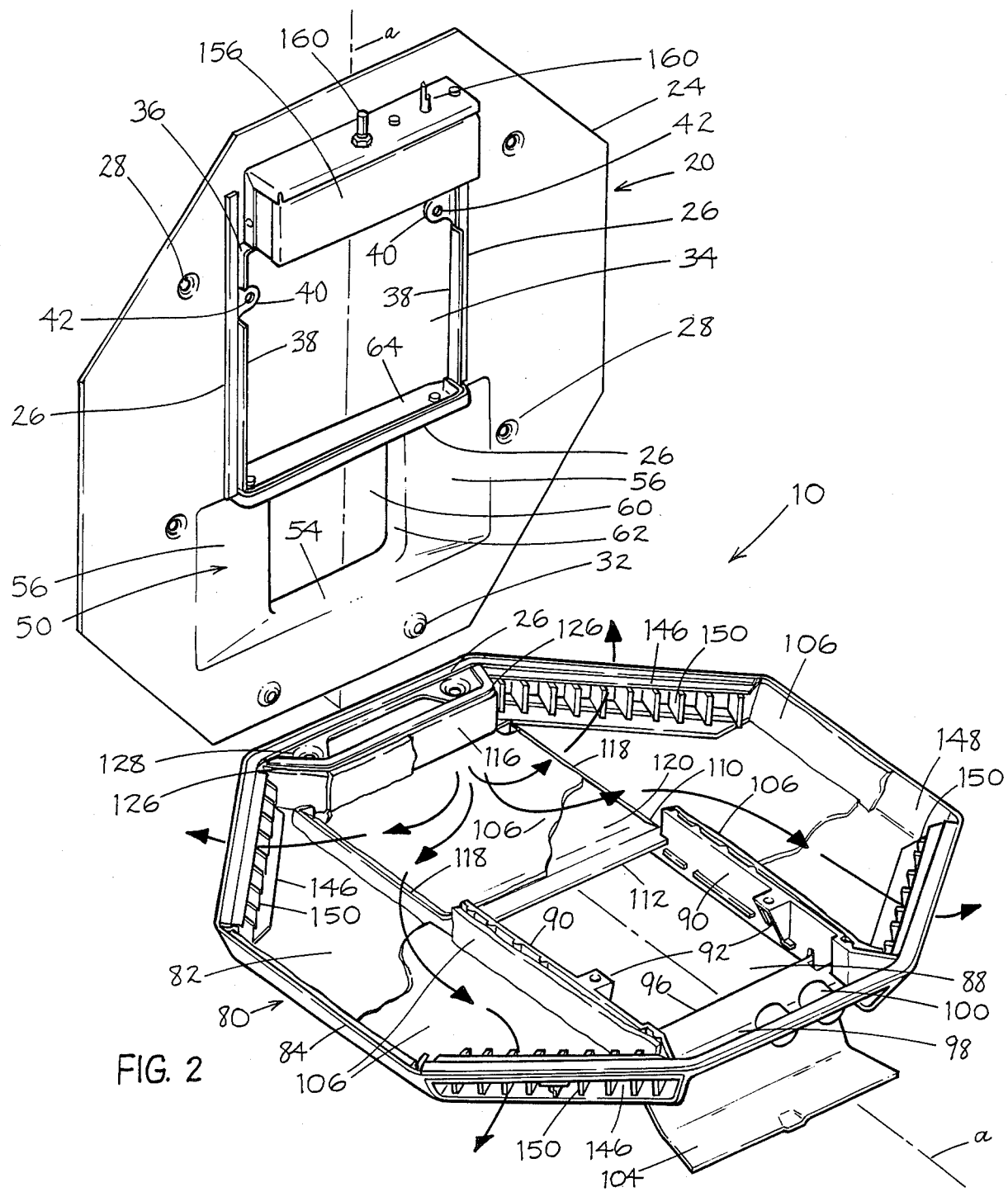
FIG. 2 is an isometric view of the interior of parts of FIG. 1, in which the sheet metal ceiling plate is shown opened upward from the distributor box.

A preferred embodiment of the present invention is the ceiling distributor duct assembly, generally designated 10 and shown in FIG. 2, to be used with an air conditioner installed on the roof of a mobile or modular home, van, boat, or other unit whose ceiling is spaced somewhat below its roof. It includes a substantially planar sheet metal ceiling plate generally designated 20, of preferably octagonal shape. On the top surface of the plate 20, inward of its octagonal border 24, is a sealing strip 26 of foam rubberlike material, which provides an airtight seal against the ceiling surface. Inward of the sealing strip 26 are four inverted countersinks 28 for mounting bolts to a roof-mounted air conditioning unit, not shown. Two downward-dimpled countersinks 32 at the aft end of the ceiling plate 20, are provided to engage screws securing the aft portion of an air distributor duct generally designated 80, hereafter described.

Along the forward portion of a fore-and-aft centerline a—a of the ceiling plate 20 is a rectangular opening through which air is drawn from the room space below the ceiling duct assembly 10. This return air opening 34 has flanges drawn downwardly from the plane of the plate 20; these include a short flange 36 at the forward side of the opening 34, and two side wall flanges 38 extending from the forwardside flange 36 aft to a vertical sheet metal plate 64, hereafter described.

Each side wall flange 38 is interrupted at its forward end by a tab 40 extending, in the plane of the plate 20, inward into the return air opening 34, including a screw hole 42 for mounting the front portion of the air distributor box 80. Immediately outward of each side wall 38, the undersurface of the plate 20 is lined with a sealing strip 26.

Figure 4:
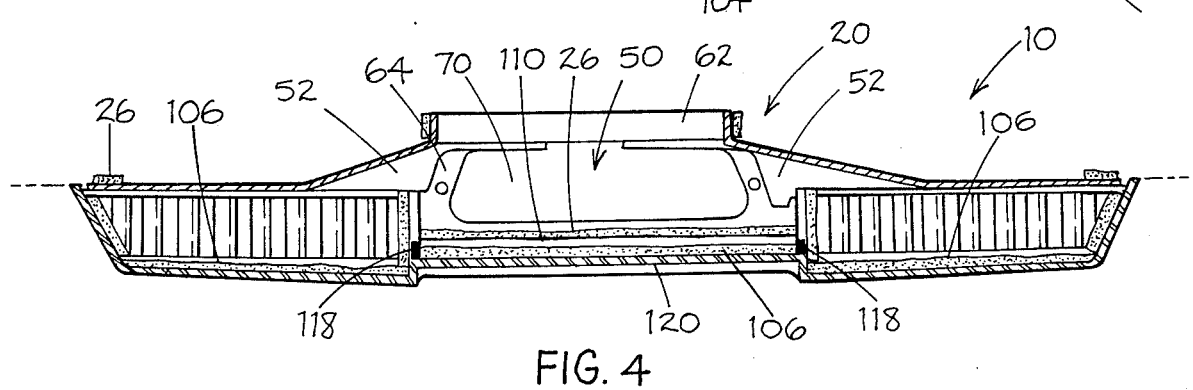
FIG. 4 is a sectional view along line 4—4 of FIG. 1.

Aft of the return air opening 34 are elements which together form a plenum, generally designated 50, shown at center of cross-sectional view FIG. 4. Those elements, which are integral parts of the plate 20, include a pair of short, somewhat triangular upward-sloping elements 52 (which support the vertical plate 64 hereafter referred to), and an aft plenum wall 54 drawn upward from the plane of the ceiling plate 20; also plenum side walls 56 which, commencing farther outward from the centerline than the side wall flanges 38 of the return air opening 34, are drawn slopingly upward, above the plane of the ceiling plate 20. Here, as shown in FIG. 2, they provide a plenum opening 60 for the discharge of conditioned air from a rooftop air conditioner, not shown. The opening 60 has an extruded collar or flange 62 for connecting a duct, not shown, from the roof-mounted air conditioner.

Secured to the short triangular forward elements 52 is a vertical sheet metal plate 64 having aft-bent upper flanges 65 attached to the aforesaid upper plenum portions. The plate 64 serves as the forward wall of the plenum. It has a horizontally-enlarged knock-out portion 70 which extends almost its full width. When the knock-out portion 70 is removed, an optional heating element 166 (hereafter described) can be inserted beneath the plenum opening 60 and secured by screws provided on the plate 64. The lower edge of the downward-extending plate 64 has a horizontal flange 66 whose bottom surface is covered by a sealing strip 26.

Presented against the sheet metal ceiling plate 20 is a preferably octagonal plastic air distributor box generally designated 80, best seen in FIG. 2. It has a somewhat streamlined contour. Its bottom wall 82 slopes slightly upward from a central planar portion to terminate in an octagonal outer margin 84 having a sharply upward slope. Positioned along its central planar portion, which is preferably parallel to the ceiling plate 20, are a forward return air opening 88 and an aft bottom plenum wall portion 120.

On each side of the centerline a—a, the sides of the return air opening 88 are bounded by integrally molded vertical walls 90 extending upward from the air distributor box bottom wall 82, to be presented against the sealing strips 26 there provided on the undersurface of the ceiling plate 20. An insulating liner 106 covers the outer surface of each bounding vertical wall 90. Along the inner sides of the walls 90, positioned to be in registration with the tabs 40 of the ceiling plate 20 for screw assembly thereto, are integrally molded mounting lugs 92.

At the forward end of the return air opening 88, the air distributor box bottom wall 82 is offset upwardly to provide a horizontal shelf-like enclosure 96 for the control box 156, hereafter referred to, mounted onto the ceiling plate 20. This enclosure 96 is completed at its forward end by a shallow upward-sloping control compartment wall 98, which has two molded recesses 100 for housing function and thermostat control knobs. The markings for these controls are printed on a control marking plate 102 mounted forwardly of the control knob recesses 100. This marking plate 102 and the control knobs are normally concealed behind a plastic forward-access door 104, hinged at the forward end of the return air inlet, whose configuration conforms to the outer margin 84 of the distributor box 80.

A flange 110, at the forward end of the bottom plenum wall portion 120, terminates in a horizontal shelf 112 which separates the plenum from the aft end of the return air opening 88. The sealing strip 26 on the horizontal flange 66 of the downward-extending sheet metal plate 64 rests on the horizontal shelf 112 of the distributor box 80. This prevents air exchange between the return air openings 34, 88 and the plenum 50.

On the aft side of the bottom plenum wall portion 120 of the air distributor box 80, an upward flange 116, extending to the plane of the ceiling plate 20, provides an aft plenum wall. The part of the distributor box bottom wall 82 providing the bottom plenum wall portion 120, delineated by two parallel shallow flanges 118 reaching from the aft plenum wall 116 to the forward-end flange 110, is offset slightly upwardly from the adjacent portions of the distributor box bottom 82. The aft plenum wall 116, the forward-end flange 110, and the bottom plenum wall portion 120 are lined with thick, compressible insulating material 106.

Extending from either side of the aft plenum wall 116 are vertical walls 126 reaching aft, with some outward slant, to the outer margin 84. Between the upper edges of the aft-extending walls 126, the aft wall 116 and the outer margin 84, is a horizontal reinforcing plate portion 128. This horizontal plate portion 128 is outlined by a sealing strip 26 providing an air-tight seal between the air distributor box 80 and the ceiling plate 20. Beneath the horizontal plate portion 128 is a rear access door 136, extending aft from its hinged mounting provision beneath the intersection of the bottom plenum wall 120 and the aft wall 116. The door 136 continues the general contour of the distributor box 80 aft to and including its margin 84, and provide access to mounting screws.

Figure 3:
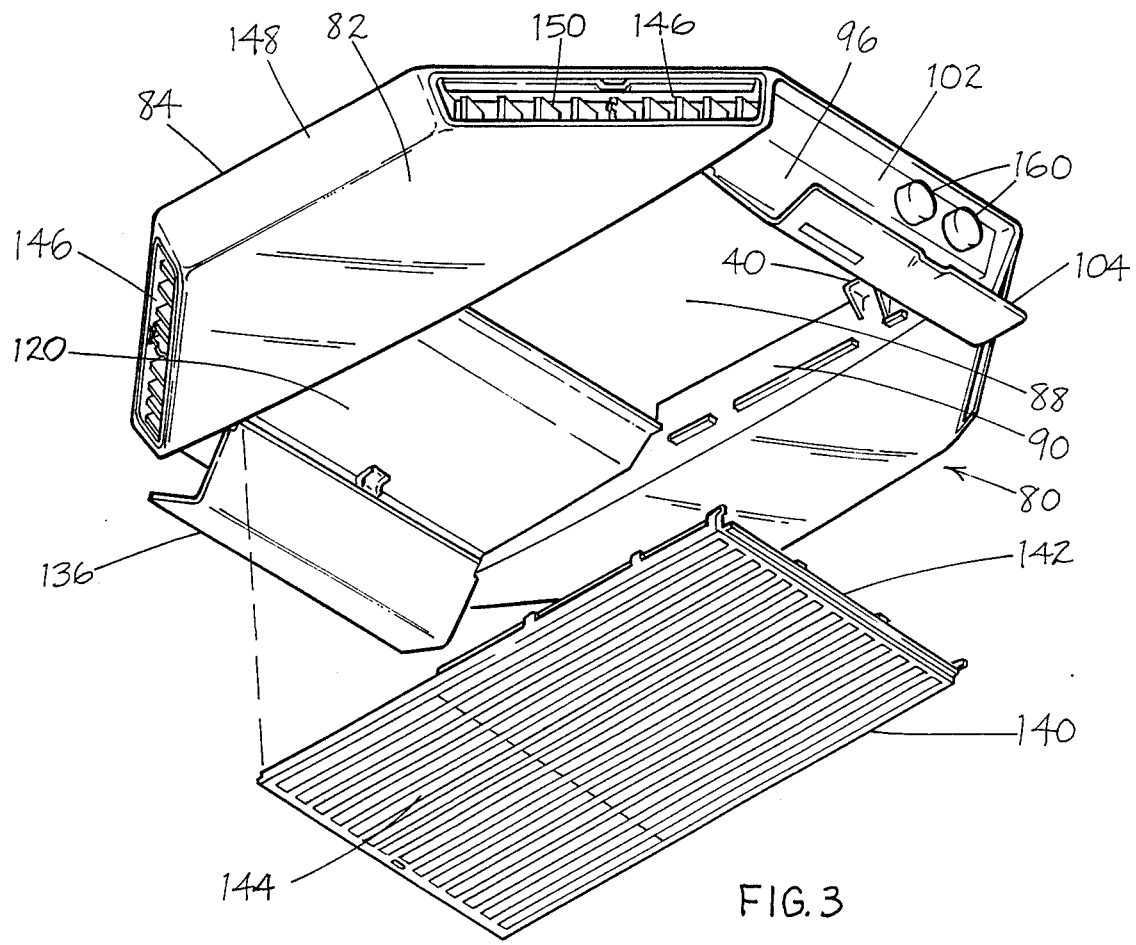
FIG. 3 is an isometric view of the distributor box shown from below with the return air grille in downwardly exploded position.

A rectangular removable return air grille 140, shown positioned downward in FIG. 3, with a filter 142 on its inner surface, covers the undersurface of the return air opening 88, with a false portion 144 beneath the bottom plenum wall portion 120 of the air distributor box 80. Removal of the grille 140 provides access to the control box 156 and optional heating module 166, hereafter described.

Outlet grilles 146, having adjustable louvers 150, are positioned along the angled sides of the outer margin 84, outward of the forward and rear access doors 104, 136, at the intersections with the margin 84 of the bounding vertical walls 90 and the aft-extending vertical walls 126. Using a distributor box of true octagon shape, these angled sides will be at 45° from the fore-and-aft centerline, or with variant shapes, from 30° to 60° therefrom. Between the forward and aft outlet grilles 146 on each side of the centerline, is an intermediate solid margin wall portion 148 lined with the thick, compressible insulating material 106.

The material 106 lines the surface of the air distributor box bottom 82 between the outer margin 84 and the bounding vertiwalls 90 and the aft-extending vertical walls 126. This defines a duct area along which conditioned air flows, with minimum inpedence, sidewardly outward from the plenum 50 to be discharged in four directions through the outlet grilles 146.

Figure 1:
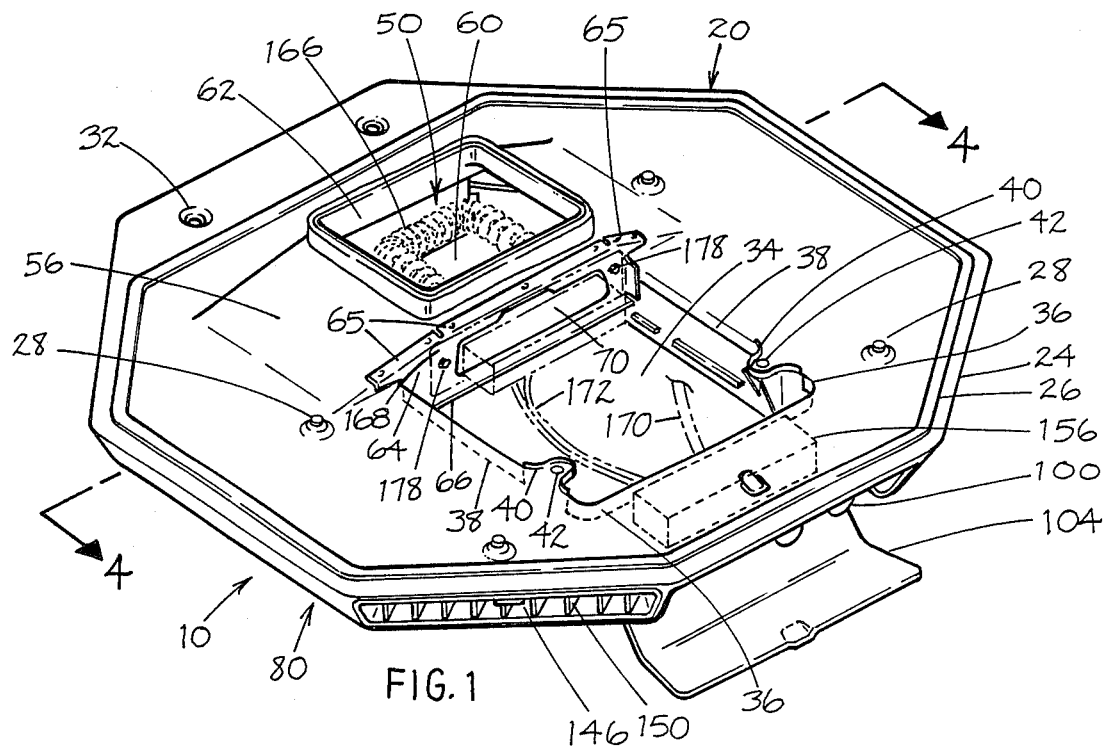
FIG. 1 is an isometric view from above showing the sheet metal ceiling plate assembled with the plastic distributor box of the present invention. Phantom lines show installation of an optional heating assembly and wiring thereto from a forward-located control box.

A control box 156, shown in phantom lines in FIG. 1, is mounted onto the forward flange 36 of the ceiling plate return air opening 34. Control knobs 160, fitting through the molded recesses 100 on the shelf-like enclosure 96 of the air distributor box 80, are accessed by opening the forward hinged door 104. Wiring 170 from the control box 156 extends upward through the return air opening 34 to the air conditioning unit (not shown) on the roof; and wiring 172 may also extend across the return air opening 34 to an optional heating element, as now described.

An optional heating module 166 mounted onto a vertical plate 168 and shown in phantom lines in FIG. 1, may be installed to project horizontally beneath the plenum 50, first removing the knock-out portion 70 of the vertical plate 64 at the forward side of the plenum 50. The heater mounting plate 168 has conventional mounting slots which slide downward on projecting screws 178 with which the vertical plate 64 is factory-equipped. A conventional junction box on the forward side of the heater mounting plate 168 is suggested in phantom lines. Access for mounting and servicing this module 166 is easily gained by removing the grille 140 covering the return air opening 88.

From this disclosure, modifications of the invention, departing from the foregoing described embodiment, will be apparent. For example, the ceiling plate may be molded of a suitable high temperature high impact strength plastic material; the sealing strips and insulated liners may be replaced by a low-density, compressible molded styrofoam liner. It is therefore to be understood that within the scope of the appended claims, the invention may be practiced otherwise than as here specifically described.

We claim:

1. For use with an air conditioner to be installed on the roof spaced above a ceiling over room space, a ceiling distributor duct assembly comprising
   A. a substantially planar ceiling plate, having therethrough, at the plane of said plate,
   a return air opening and a conditioned air discharge opening, both located adjacent to each other in fore-and-aft relationship substantially along a centerline of said plate,
   said conditioned air discharge opening being part of an upper plenum portion including a plenum inlet having duct connector means above the plane of said ceiling plate, forward-and-aft walls transverse to such centerline and reaching down at least to said plane, and plenum sides diverging outwardly and downwardly to the plane of said plate,
   in combination with
   B. a molded plastic air distributor box having a bottom wall terminating in an outer margin presented sealedly against the ceiling plate,
   said air distributor box bottom wall having a return air opening adapted to communicate with the said return air opening of said ceiling plate, and having a bottom plenum wall portion at a depth beneath said ceiling plate sufficient to afford air flow sidewardly outward from said plenum inlet,
   there being provided, as between said ceiling plate and said air distributor box bottom wall, vertical walls along the forward-and-aft sides of said bottom plenum wall portion, and a pair of vertical walls bounding those sides of said distributor box return air opening which continue forwardly from that wall at the forward side of said plenum and extend to said outer margin,
   whereby those bottom wall portions sideward of the said bounding vertical walls comprise, with the, duct boundaries extending sidewardly outward from said plenum inlet and forward along the sides of said return air opening to adjacent outer margin portions of the bottom wall,
   there being outlet grilles along said outer margin at the forward ends of said boundaries.

2. A ceiling distributor duct assembly as defined in claim 1, said vertical wall along the forward side of said plenum being a sheet metal plate extending downward from said ceiling plate to said air distributor box bottom, and having means for mounting a horizontal heating element spacedly beneath the conditioned air discharge opening,
   whereby such heating element is accessible from the lower side of said return air opening.

3. A ceiling distributor duct assembly as defined in claim 1, in which said vertical walls and the said vertical wall along the aft side of said plenum are molded integral with and extend upward from said air distributor box bottom wall.

4. A ceiling distributor duct assembly as defined in claim 1, said bottom plenum wall portion and said return air opening of said air distributor box bottom wall being in a substantially central portion of said box and in a plane substantially parallel to said ceiling plate,
   said air distributor box bottom wall sloping upward from such central portion to the outlet grilles at said outer margin,
   whereby to provide a streamlined contour to said box while presenting minimum impedance to the airflow from said plenum to said outlet grilles.

5. A ceiling distributor duct assembly as defined in claim 1, wherein said air distributor box outer margin is a substantially octagonal wall and said outlet grilles are positioned along alternate faces thereof.

6. A ceiling distributor duct assembly as defined in claim 1, wherein the said vertical walls provided as between said ceiling plate and said air distributor box bottom wall comprise
   (a) a vertical wall along with the forward side of said bottom plenum wall portion between said air distributor box and said ceiling plate,
   (b) a vertical wall along the aft side of said bottom plenum wall portion between said air distributor box and said ceiling plate, there being further provided, as between said ceiling plate and said air distributor box
   (c) a pair of vertical walls bounding those sides of said distributor box return air opening which continue forwardly from the forward side of said plenum to said outer margin, and
   (d) a pair of vertical walls which continue generally aft from the ends of said aft side wall to said outer margin,
   the said bounding and the generally aft-extending vertical walls and said air distributor box bottom thereby providing duct boundaries extending to said outer margin, together with
   outlet grilles along said outer margin, positioned at angles between 30 degrees to 60 degrees from a fore-and-aft centerline of said air distributor box,
   whereby the discharge through said outlet grilles of such conditioned air is outward in four directions, while return air is drawn centralled upward, thereby providing improved air circulation.

7. A ceiling distributor duct assembly as defined in claim 1, wherein there are further provided, as between said ceiling plate and said air distributor box, vertical walls extending generally aft to said outer margin from said wall at the aft side of said bottom plenum wall portion,
   whereby to comprise, with portions of said air distributor box bottom wall, duct boundaries extending aft from both sides of said plenum,
   there being outlet grilles along said outer margin at the aft ends of said boundaries.

8. A ceiling distributor duct assembly as defined in claim 7, wherein generally aft-extending vertical walls are molded integral with and extending upward from said air distributor box bottom wall.

9. For use with an air conditioner to be installed on the roof spaced above a ceiling over room space, a ceiling distributor duct assembly comprising
   A. a substantially planar ceiling plate having therethrough at the plane of said plate,
   a return air opening and a conditioned air discharge opening, both located adjacent to each other in fore-and-aft relationship substantially along a centerline of said plate,
   said conditioned air discharge opening being part of an upper plenum portion including a plenum inlet having duct connector means above the plane of said ceiling plate, forward-and-aft walls transverse to such centerline and reaching down at least to said plane, and plenum sides diverging outwardly and downwardly to the plane of said plate,
   said ceiling plate further having continuing from the forward side of said upper plenum portion, a downward-extending sheet metal vertical wall including means for mounting a heating element to extend inwardly beneath said conditioned air discharge opening, in combination with B. a molded plastic air distributor box having a bottom wall terminating in an outer margin presented sealedly against the ceiling plate, said air distributor box including a bottom wall having a return air opening adapted to communicate with the said return air opening of said ceiling plate, and having a bottom plenum wall portion against which the lower edge of said vertical wall extending downward from the ceiling plate is presented, the depth of said bottom plenum wall portion beneath said ceiling plate being sufficient to afford air flow sidewardly outward from said plenum, there being provided, as between said ceiling plate and said air distributor box, (a) a vertical wall along the aft side of said bottom plenum wall portion between said air distributor box and said ceiling plate, and having extending generally aft from the ends of said wall (b) a pair of vertical walls extending to said outer margin, and (c) a pair of vertical walls bounding those sides of said distributor box return air opening which continue forwardly from the sheet metal wall at the forward side of said plenum, to said outer margin, the said bounding walls and the generally aft-extending vertical walls and said air distributor box bottom providing duct boundaries extending to said outer margin, together with outlet grilles thereat, positioned at angles between 30 degrees to 60 degrees from a fore-and-aft centerline of said air distributor box, whereby to provide air discharge in four directions.

10. For use with an air conditioner to be installed on the roof spaced above a ceiling over room space, a ceiling distributor duct assembly comprising A. a substantially planar ceiling plate having therethrough, at the plane of said plate, a return air opening and a conditioned air discharge opening, located adjacent to each other in fore-and-aft relationship substantially along a centerline of said plate, said conditioned air discharge opening being part of an upper plenum portion including a plenum inlet having duct connector means above the plane of said ceiling plate, said upper plenum portion further having forward-and-aft walls transverse to such centerline and extending down at least to said plane, and upper plenum sides diverging outwardly and downwardly to said said plane, in combination with B. an air distributor box having a bottom wall terminating in an outer margin presented sealedly against the ceiling plate, said air distributor box bottom wall having a portion in registration with said conditioned air discharge opening of said ceiling plate and at a depth beneath said ceiling plate sufficient to afford air flow sidewardly outward from said plenum inlet beneath said upper plenum sides, said air distributor box bottom wall outer margin having outlet grilles therealong, there being provided as between said ceiling plate and said air distributor box bottom wall, substantially vertical wall means separating the conditioned air discharge opening of said ceiling plate from the return air opening therein.

11. A ceiling distributor duct assembly as defined in claim 10, wherein said substantially vertical wall means separating said conditioned air discharged opening and said return air opening includes means for mounting a horizontal heating element spacedly beneath the conditioned air discharge opening, said distributor box bottom wall being open beneath said return air opening and forwardly of said substantially vertical wall means, whereby to permit access to a heating element so mounted without removing said distributor box.

12. For use with an air conditioner to be installed on the over room space, a ceiling distributor duct assembly comprising A. a ceiling plate having therethrough a return air opening and a conditioned air discharge opening, both located adjacent to each other in fore-and-aft relationship substantially along a centerline of said plate, said conditioned air discharge opening being part of an upper plenum portion including forward and aft plenum walls transverse to such centerline, a plenum inlet having duct connector means, and plenum sides, in combination with B. an air distributor box having a bottom wall terminating in an outer margin presented sealedly against the ceiling plate, said air distributor box bottom wall having a return air opening adapted to communicate with the said return air opening of said ceiling plate, and having a bottom plenum wall portion at a depth beneath said ceiling plate upper plenum portion sufficient to afford air flow sidewardly outward between said transverse plenum walls, there being provided, as between said ceiling plate and said air distributor box bottom wall, walls along the forward and the aft sides of said bottom plenum wall portion, and a pair of walls bounding those sides of said distributor box return air opening which continue forwardly from that wall at the forward side of said plenum and which extend to said outer margin, whereby said bounding walls together with those bottom wall portions sideward thereof comprise a first pair of duct boundaries extending from said plenum forward along the sides of said return air opening to adjacent outer margin portions of the bottom wall, there being further provided, as between said ceiling plate and said air distributor box, walls extending from both sides of said wall at the aft side of said bottom plenum wall portion, generally aft to said outer margin, whereby to comprise, with portions of said air distributor box bottom wall, a second pair of duct boundaries generally extending aft from both sides of said plenum, there being outlet grilles along said outer margin at the outer ends of said duct boundaries.

13. For use with an air conditioner to be installed on the roof over room space, a ceiling distributor duct assembly comprising A. a ceiling plate having therethrough a return air opening and a conditioned air discharge opening located adjacent to each other in fore-and-aft relationship substantially along a centerline of said plate, said conditioned air discharge opening being part of a plenum portion including a plenum inlet having duct connector means, forward and aft plenum walls transverse to such centerline, and plenum sides, in combination with B. an air distributor box having a bottom wall terminating in an outer margin presented against the ceiling plate, said air distributor box bottom wall having a return air opening adapted to communicate with the return air opening of said ceiling plate, and having a portion in registration with said conditioned air discharge opening of said ceiling plate and at a depth beneath said ceiling plate sufficient to afford air flow sidewardly outward from said plenum inlet to outlets located along said outer margin of the air distributor box bottom wall, there being provided as between said ceiling plate and said air distributor box bottom wall, substantially vertical wall means separating the conditioned air discharge opening of said ceiling plate from the return air opening therein, said wall means having means to provide a substantially horizontal slot for insertion of a heating element therethrough and means for mounting and receiving such heating element in position beneath said conditioned air discharge opening whereby access is provided through the return air opening of said box bottom wall for installing and removing such heating element.

* * * * *

UNITED STATES PATENT AND TRADEMARK OFFICE
CERTIFICATE OF CORRECTION

PATENT NO. : 4,709,623

DATED : December 1, 1987

INVENTOR(S) : James E. Roth, David W. Bales

It is certified that error appears in the above-identified patent and that said Letters Patent is hereby corrected as shown below:

In Column 4, line 30, delete "inpedence" and insert ---impedance---.

In Column 5, line 37, delete "the," and insert "them,".

In Column 6, line 33, delete "centralled" and insert ---centrally---.

Signed and Sealed this

Twenty-sixth Day of April, 1988

Attest:

DONALD J. QUIGG

Attesting Officer

Commissioner of Patents and Trademarks